(12) United States Patent
Yang et al.

(10) Patent No.: US 9,893,829 B2
(45) Date of Patent: Feb. 13, 2018

(54) METHOD OF PERFORMING MEASUREMENT

(71) Applicant: LG ELECTRONICS INC., Seoul (KR)

(72) Inventors: Yoonoh Yang, Seoul (KR); Jinyup Hwang, Seoul (KR); Manyoung Jung, Seoul (KR); Sangwook Lee, Seoul (KR); Suhwan Lim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 45 days.

(21) Appl. No.: 14/911,407

(22) PCT Filed: Aug. 11, 2014

(86) PCT No.: PCT/KR2014/007438
§ 371 (c)(1),
(2) Date: Feb. 10, 2016

(87) PCT Pub. No.: WO2015/026090
PCT Pub. Date: Feb. 26, 2015

(65) Prior Publication Data
US 2016/0197692 A1 Jul. 7, 2016

Related U.S. Application Data

(60) Provisional application No. 61/868,589, filed on Aug. 22, 2013.

(51) Int. Cl.
*H04L 1/00* (2006.01)
*H04J 11/00* (2006.01)
(Continued)

(52) U.S. Cl.
CPC ........... *H04J 11/005* (2013.01); *H04W 24/10* (2013.01); *H04W 48/16* (2013.01); *H04W 72/082* (2013.01)

(58) Field of Classification Search
CPC ... H04J 11/005; H04W 24/10; H04W 72/082; H04W 48/16
(Continued)

(56) References Cited

U.S. PATENT DOCUMENTS

2012/0202542 A1* 8/2012 Dimou ............. H04W 72/1231
455/509
2013/0114573 A1* 5/2013 Suzuki ................. H04L 1/1887
370/336
(Continued)

FOREIGN PATENT DOCUMENTS

KR 10-2012-0083192 A 7/2012
WO WO 2012/060602 A2 5/2012
(Continued)

*Primary Examiner* — Faisal Choudhury
(74) *Attorney, Agent, or Firm* — Birch, Stewart, Kolasch & Birch, LLP

(57) ABSTRACT

The present disclosure provides a method of performing a measurement. The method of performing a measurement may include the steps of: continuing a measurement on received signal strength indication (RSSI) for sections corresponding to the multiple of an almost blank subframe (ABS) pattern when a measurement subframe pattern representing a subframe to be measured with respect to a serving cell to which enhanced inter-cell interference coordination (eICIC) is applied is not received; averaging measurement results for the sections corresponding to the multiple of the ABS; and transmitting the average of the measurement results to the serving cell.

10 Claims, 13 Drawing Sheets

(51) Int. Cl.
*H04W 48/16* (2009.01)
*H04W 24/10* (2009.01)
*H04W 72/08* (2009.01)

(58) Field of Classification Search
USPC .......................................................... 370/252
See application file for complete search history.

(56) References Cited

U.S. PATENT DOCUMENTS

| | | |
|---|---|---|
| 2013/0215785 A1 | 8/2013 | Jung et al. |
| 2013/0294281 A1 | 11/2013 | Lee et al. |
| 2013/0294351 A1 | 11/2013 | Kwon et al. |
| 2013/0308548 A1 | 11/2013 | Kim et al. |
| 2013/0308555 A1* | 11/2013 | Ho .................... H04L 5/0048 370/329 |
| 2013/0324140 A1* | 12/2013 | Kwon ................ H04B 7/0626 455/450 |
| 2014/0241198 A1* | 8/2014 | Sun .................... H04L 5/0048 370/252 |
| 2014/0286188 A1 | 9/2014 | Kang et al. |

FOREIGN PATENT DOCUMENTS

| WO | WO 2012/108657 A2 | 8/2012 |
|---|---|---|
| WO | WO 2012/111984 A2 | 8/2012 |
| WO | WO 2013/066018 A1 | 5/2013 |

\* cited by examiner

Antenna 0

METHOD OF PERFORMING MEASUREMENT

CROSS REFERENCE TO RELATED APPLICATIONS

This application is the National Phase of PCT International Application No. PCT/KR2014/007438, filed on Aug. 11, 2014, which claims priority under 35 U.S.C. 119(e) to U.S. Provisional Application No. 61/868,589, filed on Aug. 22, 2013, which is hereby expressly incorporated by reference into the present application.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, in a next-generation mobile communication system, it is expected that a small cell having a small cell coverage radius is added within a coverage of a macro cell.

Meanwhile, an interference may be more and more increased due to such a small cell. To solve the interference, an enhanced inter-cell interference coordination (eICIC) has been introduced. According to the eICIC, a cell causing the interference suspends signal transmission during an almost blank subframe (ABS), so that a user equipment (UE) in a victim cell is not interfered.

However, since there is almost no interference on the ABS subframe, a measurement result is relatively excellent in comparison with a normal subframe. Accordingly, there is a problem in that a result of a measurement performed on the normal subframe is significantly mismatched to a result of a measurement performed on the ABS subframe.

SUMMARY OF THE INVENTION

Accordingly, an object of the present invention is to solve the above-mentioned problems.

In order to achieve the aforementioned purpose, one disclosure of the present specification provides a method of performing a measurement. The method may comprise: continuing a measurement on a received signal strength indication (RSSI) during a duration corresponding to a multiple of an almost blank subframe (ABS) pattern, upon a failure in receiving a measurement subframe pattern representing a subframe to be measured with respect to a serving cell to which an enhanced inter-cell interference coordination (eICIC) is applied; averaging measurement results during the duration corresponding to the multiple of the ABS pattern; and transmitting the average of the measurement results to the serving cell.

The method may further comprise: receiving a radio resource configuration; and determining whether the measurement subframe pattern is included in the radio resource configuration.

The continuing of the measurement during the duration corresponding to the multiple of the ABS pattern may be performed when a radio resource configuration comprising the measurement subframe pattern is not received.

The multiple of the ABS pattern may correspond to 40, 80, 120, 160, or 200 subframes.

The measurement may calculate reference signal received quality (RSRQ) or reference signal received power (RSRP).

In order to achieve the aforementioned purpose, one disclosure of the present specification provides a user equipment (UE) for performing a measurement. The UE may comprise: a processor for continuing a measurement on a received signal strength indication (RSSI) during a duration corresponding to a multiple of an almost blank subframe (ABS) pattern, upon a failure in receiving a measurement subframe pattern representing a subframe to be measured with respect to a serving cell to which an enhanced inter-cell interference coordination (eICIC) is applied, and for averaging measurement results during the duration corresponding to the multiple of the ABS pattern; and a transceiver for transmitting the average of the measurement results to the serving cell.

According to a disclosure of the present specification, a measurement can be more effectively and accurately performed.

DESCRIPTION OF EXEMPLARY EMBODIMENTS

Figure 1:
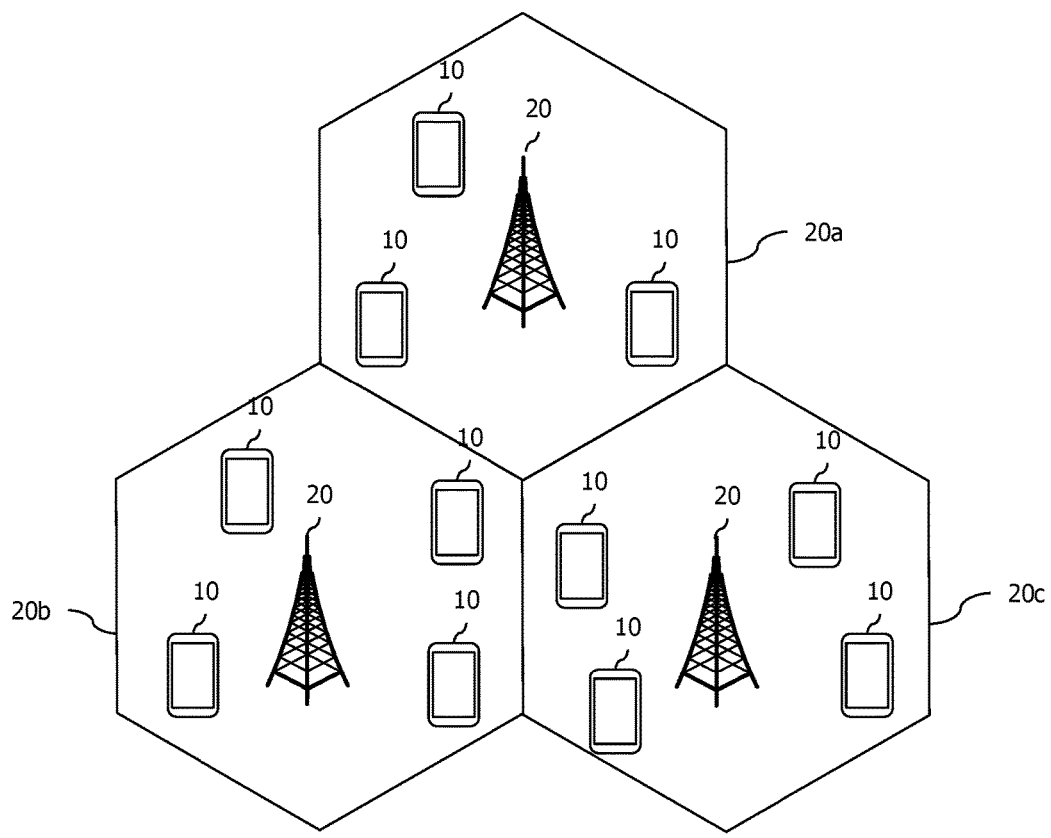
FIG. 1 shows a wireless communication system.

The present invention described hereinafter is applied on the basis of 3$^{rd}$ generation partnership project (3GPP) long term evolution (LTE) or 3GPP LTE-Advanced (LTE-A). This is for exemplary purposes only, and thus the present invention is applicable to various communication systems. In the following description, LTE and/or LTE-A are collectively referred to as LTE.

In addition, the terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein are erroneous and thus fail to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms are intended to include the plural forms as well, unless the context clearly indicates otherwise. In the present application, it is to be understood that the terms such as "including" or "having", etc., are intended to indicate the existence of all of several constitutional elements or several steps disclosed in the specification, and are not intended to preclude the possibility that some of the constitutional elements or some of the steps may not exist or additional constitutional elements or steps may further exist.

It will be understood that although the terms "first" and "second" are used herein to describe various constitutional elements, these constitutional elements should not be limited by these terms. These terms are only used to distinguish one constitutional element from another constitutional element. For example, a first constitutional element may be termed a second constitutional element, and similarly, the second constitutional element may be termed the first constitutional element without departing from the scope of the present invention.

When a constitutional element is mentioned as being "connected" to or "accessing" another constitutional element, this may mean that it is directly connected to or accessing the other constitutional element, but it is to be understood that there are no intervening constitutional elements present. On the other hand, when a constitutional element is mentioned as being "directly connected" to or "directly accessing" another constitutional element, it is to be understood that there are no intervening constitutional elements present.

Hereinafter, exemplary embodiments of the present invention will be described with reference to the accompanying drawings. It is to be noted that like reference numerals denote the same constitutional elements in the drawings, and a detailed description of a known structure or function of the present invention will be omitted herein if it is deemed to obscure the subject matter of the present invention. In the following description, well-known functions or constructions are not described in detail since they would obscure the invention in unnecessary detail. The exemplary embodiments should be considered in descriptive sense only and not for purposes of limitation, and do not intend to limit technical scopes of the present invention. However, it is to be understood that the invention is not limited to the disclosed embodiments, but, on the contrary, is intended to cover various modifications and equivalent arrangements included within the spirit and scope of the appended claims.

A term 'base station (BS)' used hereinafter is generally a fixed station which communicates with a wireless device and may be referred to as another term, such as an evolved-nodeB (eNodeB), an evolved node-B (eNB), a base transceiver system (BTS), an access point, etc.

Further, a term 'user equipment (UE)' used hereinafter may be fixed or mobile, and may be referred to as another term, such as a device, a wireless device, a terminal, a mobile station (MS), a user terminal (UT), a subscriber station (SS), a mobile terminal (MT), etc.

FIG. 1 shows a wireless communication system.

Referring to FIG. 1, a wireless communication system includes at least one base station (BS) 20. Respective BSs 20 provide communication services to specific geographical regions (generally referred to as cells) 20a, 20b, and 20c. The cell can be divided into a plurality of regions (referred to as sectors).

The UE belongs to one cell in general. A cell to which the UE belongs is called a serving cell. A BS which provides a communication service to the serving cell is called a serving BS. Since the wireless communication system is a cellular system, there may be a different cell adjacent to the serving cell. The different cell adjacent to the serving cell is called a neighbour cell. A BS which provides a communication service to the adjacent cell is called a neighbour BS. The serving cell and the neighbour cell are determined relatively with respect to the UE.

Hereinafter, a downlink implies a communication from the BS 20 to a UE 10, and an uplink implies a communication from the UE 10 to the BS 20. In the downlink, a transmitter may be a part of the BS 20, and a receiver may be a part of the UE 10. In the uplink, the transmitter may be a part of the UE 10, and the receiver may be a part of the BS 20.

Meanwhile, the wireless communication system may be any one of a multiple-input multiple-output (MIMO) system, a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas. Hereinafter, a Tx antenna implies a physical or logical antenna used to transmit one signal or stream. An Rx antenna implies a physical or logical antenna used to receive one signal or stream.

Hereinafter, an LTE system will be described in greater detail.

Figure 2:
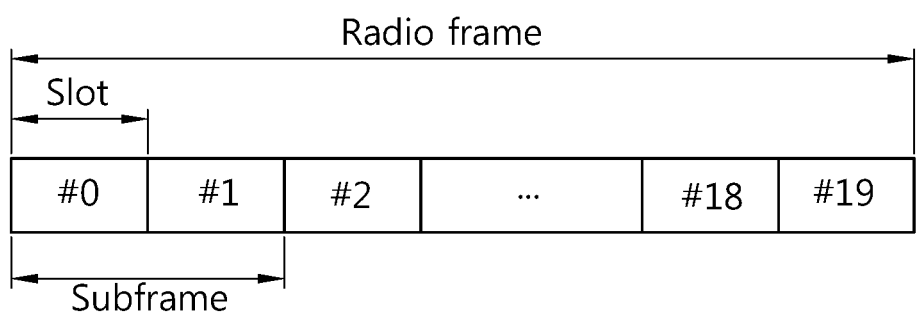
FIG. 2 shows a structure of a frequency division duplex (FDD)-based radio frame in 3rd generation partnership project (3GPP) long term evolution (LTE).

FIG. 2 shows a structure of an FDD-based radio frame in 3GPP LTE.

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
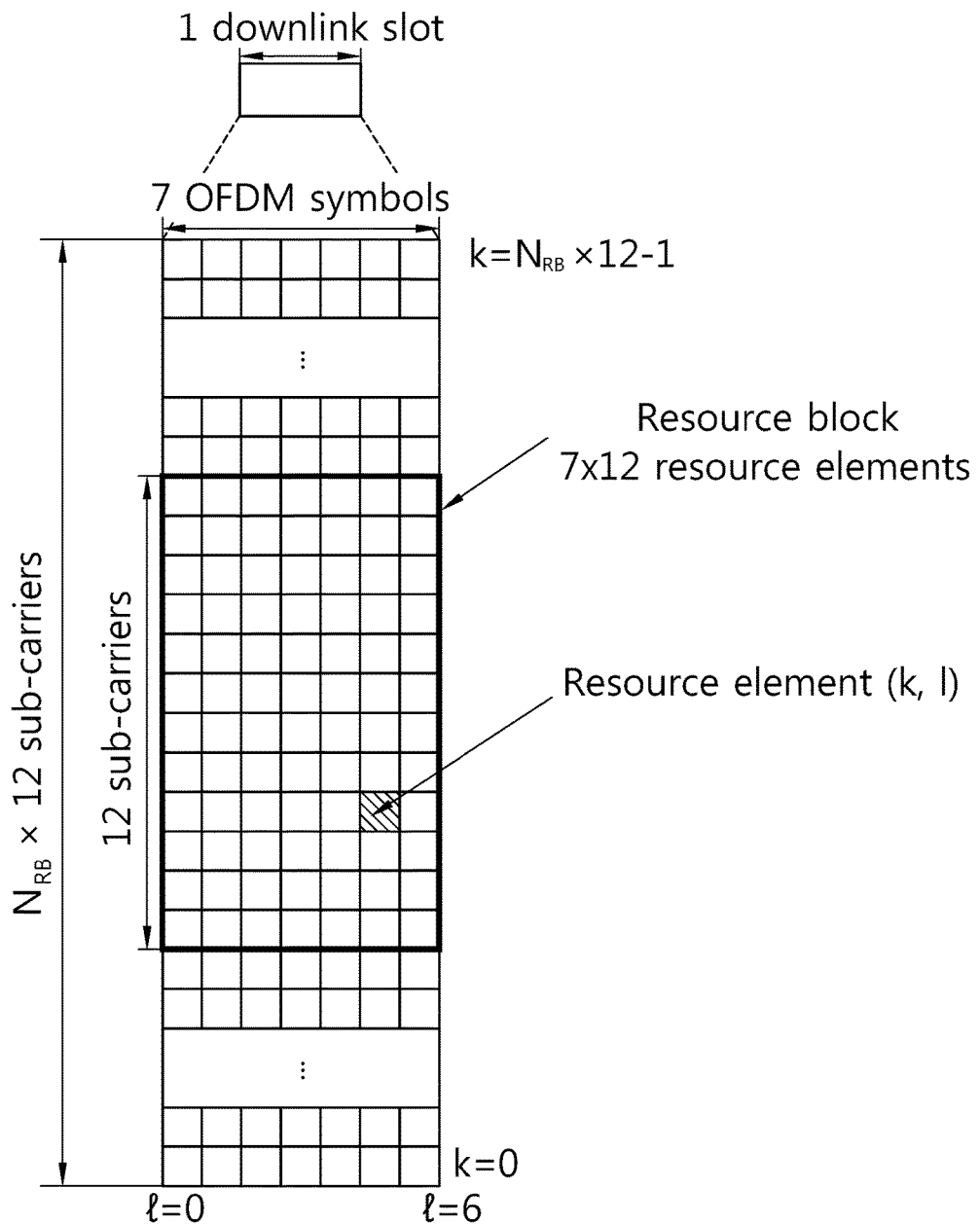
FIG. 3 shows an example of a resource grid for one uplink or downlink slot in 3GPP LTE.

FIG. 3 shows an example of a resource grid for one uplink or downlink slot in 3GPP LTE.

Referring to FIG. 3, an uplink slot includes a plurality of orthogonal frequency division multiplexing (OFDM) symbols in a time domain, and includes NRB resource blocks (RBs) in a frequency domain. For example, the number of RBs, i.e., NRB, may be any one value in the range of 6 to 110 in an LTE system.

Although it is described herein that one RB includes 7×12 resource elements consisting of 7 OFDM symbols in the time domain and 12 subcarriers in the frequency domain for example, the number of OFDM symbols and the number of subcarriers in the RB are not limited thereto. The number of subcarriers or the number of OFDM symbols included in the RB may change variously. That is, the number of OFDM symbols may change depending on the aforementioned CP length. In particular, in 3GPP LTE, it is defined such that 7 OFDM symbols are included in one slot in a normal CP case, and 6 OFDM symbols are included in one slot in an extended CP case.

The OFDM symbol represents one symbol period. The OFDM symbol can also be referred to as an SC-FDMA symbol, an OFDMA symbol, or a symbol period according to a system. As a resource allocation unit, the RB includes a plurality of subcarriers in the frequency domain. The number NUL of RBs included in an uplink slot depends on an uplink transmission bandwidth defined in a cell. Each element on the resource grid is referred to as a resource element.

Meanwhile, the number of subcarriers in one OFDM symbol may be selected from 128, 256, 512, 1024, 1536, and 2048.

Figure 4:
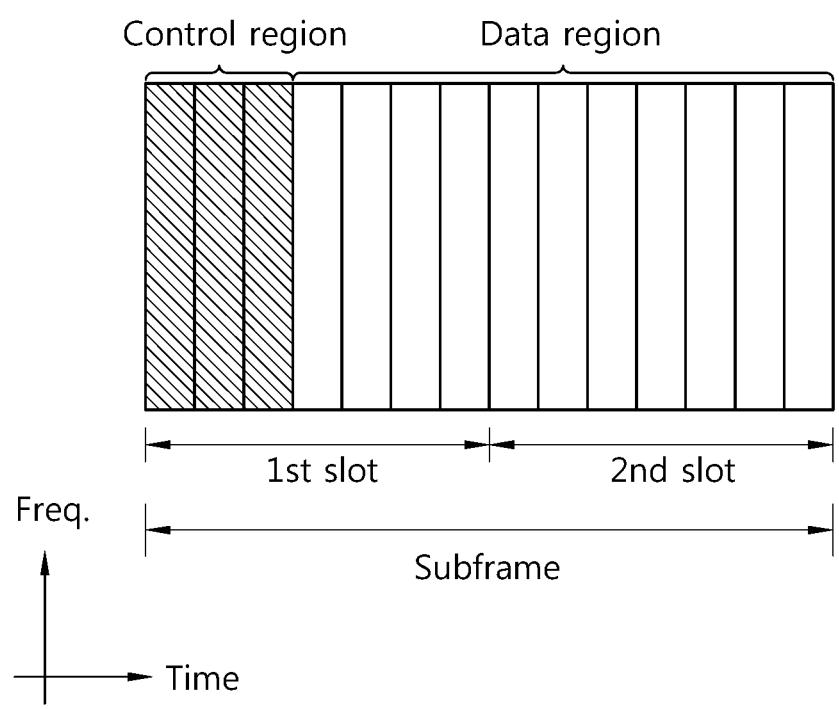
FIG. 4 shows a structure of a downlink subframe.

A resource grid for one uplink slot in 3GPP LTE of FIG. 4 may also apply to a resource grid for a downlink slot.

FIG. 4 shows a structure of a downlink subframe.

It is shown in FIG. 4 that 7 OFDM symbols are included in one slot for example by assuming a normal CP case. However, the number of OFDM symbols included in one slot may vary depending on a CP length. That is, as described above, according to 3GPP TS 36.211 V10.4.0, one slot includes 7 OFDM symbols in case of a normal CP, and one slot includes 6 OFDM symbols in case of an extended CP.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A downlink (DL) subframe is divided into a control region and a data region in the time domain. The control region includes up to first three OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

In 3GPP LTE, a physical channel may be divided into a data channel and a control channel. The data channel may be a physical downlink shared channel (PDSCH) and a physical uplink shared channel (PUSCH). The control channel may be a physical downlink control channel (PDCCH), a physical control format indicator channel (PCFICH), a physical hybrid-ARQ indicator channel (PHICH), and a physical uplink control channel (PUCCH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

A physical downlink control channel (PDCCH) can carry a downlink shared channel (DL-SCH)'s resource allocation and transmission format, uplink shared channel (UL-SCH)'s resource allocation information, paging information on a paging channel (PCH), system information on a DL-SCH, a resource allocation of a higher layer control message such as a random access response transmitted through a PDSCH, a transmission power control command for individual UEs included in any UE group, activation of a voice over Internet (VoIP), etc. A plurality of PDCCHs can be transmitted in the control region, and the UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups. A format of the PDCCH and the number of bits of the available PDCCH are determined according to a correlation between the number of CCEs and the coding rate provided by the CCEs.

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

A BS determines a PDCCH format according to downlink control information (DCI) to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for a system information block (SIB), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

In 3GPP LTE, blind decoding is used to detect a PDCCH. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking. ABS determines a PDCCH format according to DCI to be transmitted to a wireless device, attaches a CRC to control information, and masks a unique identifier (referred to as a radio network temporary identifier (RNTI)) to the CRC according to an owner or usage of the PDCCH.

The uplink channel includes a PUSCH, a PUCCH, a sounding reference signal (SRS), and a physical random access channel (PRACH).

Figure 5:
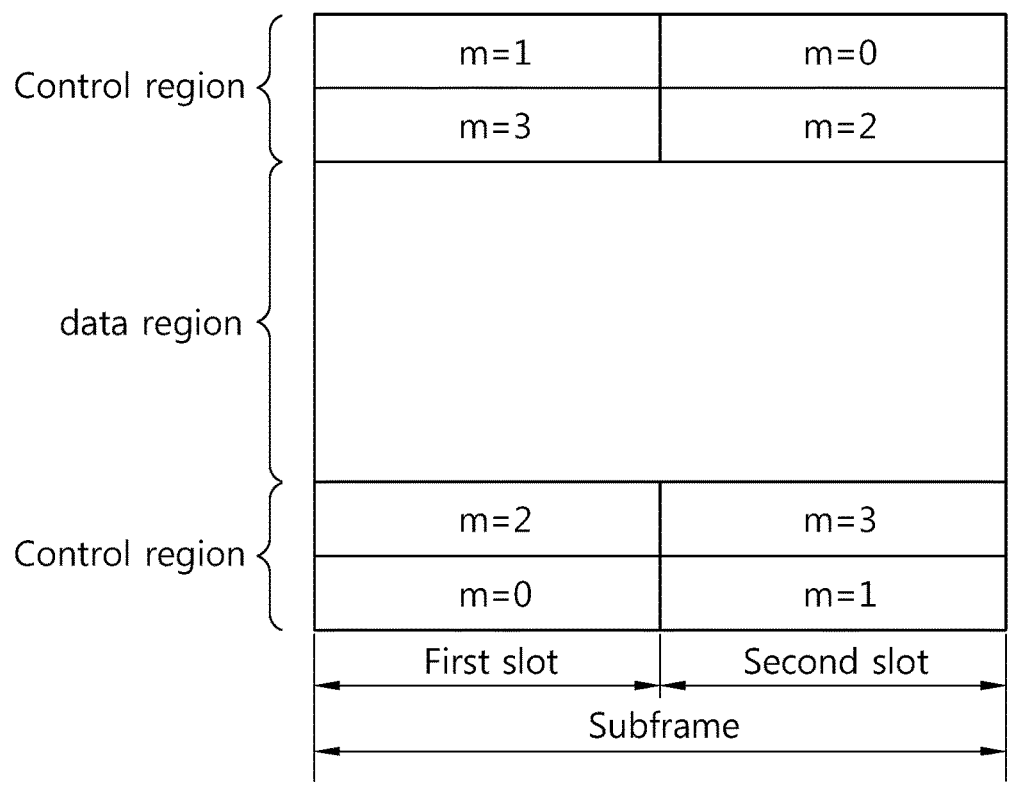
FIG. 5 shows a structure of an uplink subframe in 3GPP LTE.

FIG. 5 shows a structure of an uplink subframe in 3GPP LTE.

Referring to FIG. 5, the uplink subframe can be divided into a control region and a data region. A physical uplink control channel (PUCCH) for carrying uplink control information is allocated to the control region. A physical uplink shared channel (PUSCH) for carrying data is allocated to the data region.

The PUCCH for one UE is allocated in an RB pair in a subframe. RBs belonging to the RB pair occupy different subcarriers in each of a first slot and a second slot. A frequency occupied by the RBs belonging to the RB pair to which the PUCCH is allocated changes at a slot boundary. This is called that the RB pair allocated to the PUCCH is frequency-hopped at the slot boundary.

Since the UE transmits the uplink control information on a time basis through different subcarriers, a frequency diversity gain can be obtained. m is a location index indicating a logical frequency domain location of a RB pair allocated to a PUCCH in a subframe.

Examples of the uplink control information transmitted on a PUCCH include hybrid automatic repeat request (HARQ), acknowledgement (ACK)/non-acknowledgement (NACK), channel state information (CSI) indicating a DL channel state, scheduling request (SR) which is a UL radio resource allocation request, etc.

The PUSCH is mapped to an uplink shared channel (UL-SCH) which is a transport channel. Uplink data transmitted through the PUSCH may be a transport block which is a data block for the UL-SCH transmitted during a TTI. The transport block may be user information. In addition, the uplink data may be multiplexed data. The multiplexed data may be obtained by multiplexing the control information and a transport block for the UL-SCH. Examples of the control information to be multiplexed with data may include a channel quality indicator (CQI), a precoding matrix indicator (PMI), HARQ, a rank indicator (RI), etc. Alternatively, the uplink data may consist of only the control information.

Now, a carrier aggregation system is described.

Figure 6:
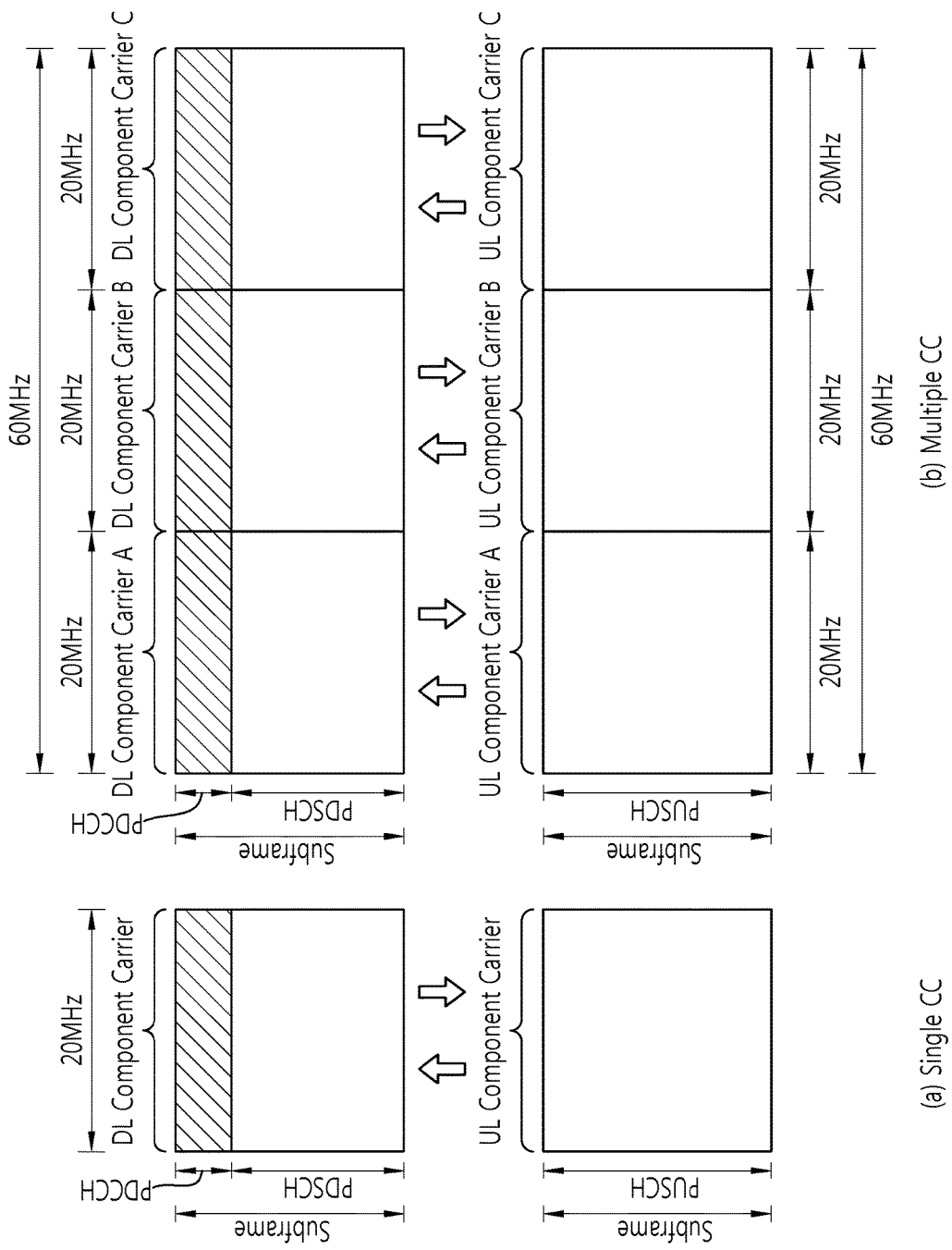
FIG. 6 shows an example of comparing a single carrier system and a carrier aggregation system.

FIG. 6 shows an example of comparing a single carrier system and a carrier aggregation system.

Referring to FIG. 6(*a*), the single carrier system supports only one carrier as to a UE in an uplink and a downlink. Although the carrier may have various bandwidths, only one carrier is assigned to the UE. Meanwhile, referring to FIG. 6(*b*), multiple component carriers (CCs), i.e., DL CCs A to C and UL CCs A to C, can be assigned to the UE in the carrier aggregation (CA) system. The CC implies a carrier used in the CA system, and may be simply referred to as a carrier. For example, three 20 MHz CCs can be assigned to allocate a 60 MHz bandwidth to the UE.

The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted such that both cases of contiguous CCs and non-contiguous CCs are included. The number of aggregated CCs may be set differently between the downlink and the uplink. Symmetric aggregation is achieved when the number of DL CCs is equal to the number of UL CCs. Asymmetric aggregation is achieved when the number of DL CCs is different from the number of UL CCs.

A CC which is a target when aggregating one or more CCs may directly use a bandwidth that is used in the legacy system in order to provide backward compatibility with the legacy system. For example, a 3GPP LTE system may support a carrier having a bandwidth of 1.4 MHz, 3 MHz, 5 MHz, 10 MHz, 15 MHz, and 20 MHz, and a 3GPP LTE-A system may configure a wideband of 20 MHz or higher by using each carrier of the 3GPP LTE system as a CC. Alternatively, the wideband may be configured by defining a new bandwidth without having to directly use the bandwidth of the legacy system.

A frequency band of a wireless communication system is divided into a plurality of carrier frequencies. Herein, the carrier frequency implies a center frequency of a cell. Hereinafter, the cell may imply a downlink frequency resource and an uplink frequency resource. Alternatively, the cell may also imply combination of a downlink frequency resource and an optional uplink frequency resource. In general, if a carrier aggregation (CA) is not considered, uplink and downlink frequency resources may always exist in pair in one cell.

In order to transmit and receive packet data through a specific cell, the UE first has to complete a configuration of the specific cell. Herein, the configuration implies a state of completely receiving system information required for data transmission and reception for the cell. For example, the configuration may include an overall procedure that requires common physical layer parameters necessary for data transmission and reception, media access control (MAC) layer parameters, or parameters necessary for a specific operation in a radio resource control (RRC) layer. A cell of which configuration is complete is in a state capable of immediately transmitting and receiving a packet upon receiving only information indicating that packet data can be transmitted.

The cell in a state of completing its configuration may exist in an activation or deactivation state. Herein, the activation implies that data transmission or reception is performed or is in a ready state. The UE may monitor or receive a control channel (i.e., PDCCH) and a data channel (i.e., PDSCH) of an activated cell in order to confirm a resource (e.g., frequency, time, etc.) allocated to the UE.

The deactivation implies that transmission or reception of traffic data is impossible and measurement or transmission/ reception of minimum information is possible. The UE may receive system information (SI) required for packet reception from a deactivated cell. On the other hand, the UE does not monitor or receive a control channel (i.e., PDCCH) and a data channel (i.e., PDSCH) of the deactivated cell in order to confirm a resource (e.g., frequency, time, etc.) allocated to the UE.

A cell can be classified into a primary cell, a secondary cell, a serving cell, etc.

The primary cell implies a cell which operates at a primary frequency, and also implies a cell which performs an initial connection establishment procedure or a connection re-establishment procedure or a cell indicated as the primary cell in a handover procedure.

The secondary cell implies a cell which operates at a secondary frequency, and is configured when an RRC connection is once established and is used to provide an additional radio resource.

The serving cell is configured with the primary cell when a carrier aggregation is not configured or when a UE cannot provide the carrier aggregation. If the carrier aggregation is configured, the term 'serving cell' is used to indicate a cell configured to the UE, and may consist of a plurality of cells. One serving cell may consist of one DL CC or a pair of {DL CC, UL CC}. The plurality of serving cells may consist of a set consisting of a primary cell and one or more of all secondary cells.

As described above, the carrier aggregation system can support a plurality of component carriers (CCs), that is, a plurality of serving cells, unlike a single-carrier system.

The carrier aggregation system can support cross-carrier scheduling. The cross-carrier scheduling is a scheduling method capable of performing resource allocation of a PDSCH transmitted by using a different carrier through a PDCCH transmitted via a specific CC and/or resource allocation of a PUSCH transmitted via another CC other than a CC basically linked to the specific CC. That is, the PDCCH and the PDSCH can be transmitted through different DL CCs, and the PUSCH can be transmitted via a UL CC other than a UL CC linked to a DL CC on which a PDCCH including a UL grant is transmitted. As such, in a system supporting the cross-carrier scheduling, a carrier indicator is required to report a specific DL CC/UL CC used to transmit the PDSCH/PUSCH for which the PDCCH provides control information. A field including the carrier indicator is hereinafter called a carrier indication field (CIF).

The carrier aggregation system supporting the cross-carrier scheduling may include a CIF in the conventional downlink control information (DCI) format. In a system supporting the cross-carrier scheduling, e.g., an LTE-A system, the CIF is added to the conventional DCI format (i.e., the DCI format used in LTE) and thus the number of bits can be extended by 3 bits, and the PDCCH structure can reuse the conventional coding scheme, resource allocation scheme (i.e., CCE-based resource mapping), etc.

Meanwhile, various reference signals (RSs) are transmitted in a subframe.

In general, a reference signal (RS) is transmitted as a sequence. Any sequence may be used as a sequence used for an RS sequence without particular restrictions. The RS sequence may be a phase shift keying (PSK)-based computer generated sequence. Examples of the PSK include binary phase shift keying (BPSK), quadrature phase shift keying (QPSK), etc. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, etc. Alternatively, the RS sequence may be a pseudo-random (PN) sequence. Examples of the PN sequence include an m-sequence, a computer generated sequence, a Gold sequence, a Kasami sequence, etc. In addition, the RS sequence may be a cyclically shifted sequence.

A downlink reference signal (RS) can be classified into a cell-specific RS (CRS), a Multimedia Broadcast and multicast Single Frequency Network (MBSFN) RS, a UE-specific RS (URS), a positioning RS (PRS), and a channel state information (CSI) RS (CSI-RS). The CRS is an RS transmitted to all UEs in a cell. The CRS can be used in channel measurement for a CQI feedback and in channel estimation for a PDSCH. The MBSFN RS can be transmitted in a subframe allocated for MBSFN transmission. The URS is an RS received by a specific UE or a specific UE group in the cell, and can also be called a demodulation RS (DM-RS). The DM-RS is primarily used in data demodulation of a specific UE or a specific UE group. The PRS may be used for location estimation of the UE. The CSI-RS is used in channel estimation for a PDSCH of an LTE-A UE. The CRI-RS is relatively sparsely arranged in a frequency domain or a time domain. The CSI-RS can be punctured in a data region of a normal subframe or an MBSFN subframe.

Figure 7:
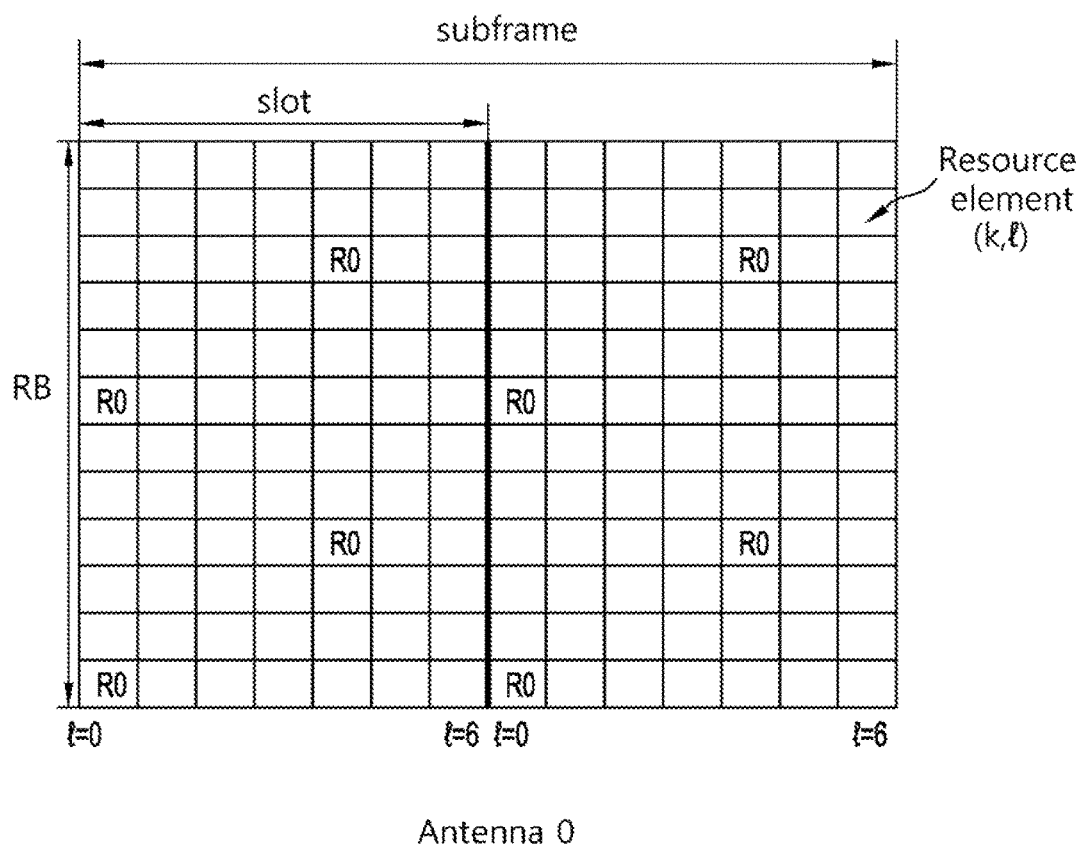
FIG. 7 shows an example of a pattern in which a cell-specific reference signal (CRS) is mapped to a resource block (RB) when a base station (BS) uses one antenna port.

FIG. 7 shows an example of a pattern in which a CRS is mapped to an RB when a BS uses one antenna port.

Referring to FIG. 7, R0 denotes an RE to which a CRS transmitted using an antenna port number 0 of a BS is mapped.

The CRS is transmitted in all downlink subframes in a cell which supports a PDSCH transmission. The CRS may be transmitted on antenna ports 0 to 3. The CRS may be defined only for $\Delta f=15$ kHz. A pseudo-random sequence $r_{l,ns}(m)$ generated from a seed value based on a cell identity (ID) is subjected to resource mapping to a complex-valued modulation symbol $a^{(p)}_{k,l}$. Herein, $n_s$ denotes a slot number in one radio frame, p denotes an antenna port, and l denotes an OFDM symbol number in a slot. k denotes a subcarrier index. l and k are expressed by the following equation.

$$k = 6m + (v + v_{shift}) \bmod 6 \quad \text{[Equation 1]}$$

$$l = \begin{cases} 0, N^{DL}_{symb} - 3 & \text{if } p \in \{0,1\} \\ 1 & \text{if } p \in \{2,3\} \end{cases}$$

$$v_{shift} = N^{cell}_{ID} \bmod 6$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

In the above equation, p denotes an antenna port, and ns denotes a slot number 0 or 1.

k has 6 shifted indices according to a cell ID ($N^{Cell}_{ID}$) Accordingly, cells having cell IDs 0, 6, 12, etc., which are a multiple of 6, transmit a CRS in the same subframe position k.

In the above equation, l is determined according to the antenna port p, and a possible value for l is 0, 4, 7, 11. Accordingly, the CRS is transmitted on symbols 0, 4, 7, and 11.

A resource element (RE) allocated to a CRS of one antenna port cannot be used in a transmission of another antenna port, and must be set to zero. Further, in a multicast-broadcast single frequency network (MBSFN) subframe, the CRS is transmitted only in a non-MBSFN region.

Figure 8:
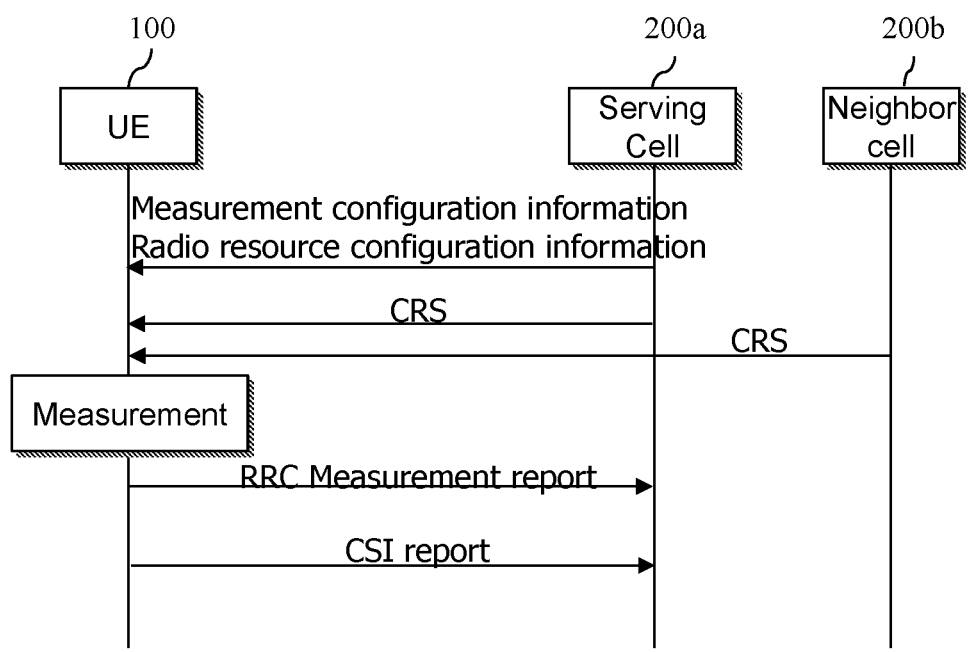
FIG. 8 shows measurement and measurement reporting procedures.

FIG. 8 shows measurement and measurement reporting procedures.

It is necessary for a mobile communication system to support a mobility of a UE 100. Therefore, the UE 100 persistently measures quality for a serving cell which currently provides a service and quality for a neighbour cell. The UE 100 reports a measurement result to a network at a proper time, and the network provides an optimal mobility to the UE through a handover or the like. A measurement performed for such a purpose is ordinarily called a radio resource management (RRM).

Meanwhile, the UE 100 monitors downlink quality of a primary cell (Pcell) on the basis of a CRS. This is called radio link monitoring (RLM). For the RLM, the UE 100 estimates the downlink quality, and compares it with thresholds (e.g., Qout and Qin) of the estimated downlink quality. The threshold Qout is defined as a level at which a downlink cannot be received reliably, and this corresponds to a 10% error of a PDCCH transmission by considering a PCFICH error. The threshold Qin is defined as a level at which the downlink is significantly reliable in comparison with Qout, and this corresponds to a 2% error of the PDCCH transmission by considering the PCFICH error.

As can be seen with reference to FIG. 8, if each of a serving cell 200*a* and a neighbour cell 200*b* transmits a cell-specific reference signal (CRS) to the UE 100, the UE 100 performs a measurement through the CRS, and transmits an RRC measurement report message including a measurement result thereof to the serving cell 200*a*.

In this case, the UE 100 may perform the measurement by using three methods described below.

1) Reference signal received power (RSRP): It indicates average reception power of all REs which carry a CRS transmitted through the entire band. In this case, average reception power of all REs which carry a CSI RS may be measured instead of the CRS.

2) Received signal strength indicator (RSSI): It indicates reception power measured in the entire band. The RSSI includes all of a signal, an interference, and a thermal noise.

3) Reference symbol received quality (RSRQ): It indicates a CQI, and may be determined as a different RSRP/RSSI according to a measurement bandwidth or subband. That is, the RSRQ implies a signal-to-noise interference ratio (SINR). Since the RSRP cannot provide sufficient mobility information, the RSRQ may be used in a handover and a cell reselection instead of the RSRP.

It may be calculated as RSRQ=RSSI/RSSP.

Meanwhile, the UE 100 receives a measurement configuration information element (IE) from the serving cell 200*a* for the measurement. A message including the measurement configuration IE is called a measurement configuration message. Herein, the measurement configuration IE may also be received through an RRC connection reconfiguration message. When the measurement result satisfies a report condition in measurement configuration information, the UE reports a measurement result to a BS. The message including the measurement result is called a measurement report message.

The measurement configuration IE may include measurement object information. The measurement object information is information regarding an object for which a measurement is performed by the UE. The measurement object includes at least one of an intra-frequency measurement object which is an object of an intra-frequency measurement, an inter-frequency measurement object which is an object of an inter-frequency measurement, and an inter-RAT measurement object which is an object of an inter-RAT measurement. For example, the intra-frequency measurement object may indicate a neighbour cell having the same frequency band as a frequency band of a serving cell, the inter-frequency measurement object may indicate a neighbour cell having a frequency band different from a frequency band of the serving cell, and the inter-RAT measurement object may indicate a neighbour cell having an RAT different from an RAT of the serving cell.

Specifically, the measurement configuration IE includes IEs shown in the following table.

TABLE 1

MeasConfig ::=
-- Measurement objects
  measObjectToRemoveList
  measObjectToAddModList The measurement objects IE includes measObjectToRemoveList which indicates a list of measObject to be removed and measObjectToAddModList which indicates a list to be newly added or to be modified.

The measObject includes MeasObjectCDMA2000, MeasObjectEUTRA, MeasObjectGERAN, etc., according to a communication technique.

Meanwhile, the MeasObjectEUTRA IE includes information applied for an intra-frequency or an inter-frequency as to a measurement of an E-UTRA cell. The MeasObjectEUTRA IE is expressed by the following table.

TABLE 2

1) MeasObjectEUTRA
   neighCellConfig
  measSubframePatternConfigNeigh-r10
2) MeasSubframePatternConfigNeigh-r10
     measSubframePatternNeigh-r10
     measSubframeCellList-r10

The MeasObjectEUTRA IE is expressed more specifically by the following table.

TABLE 3

Description on MeasObjectEUTRA field carrierFreq
To identify an E-UTRA carrier frequency at which this configuration
is valid.
neighCellConfig
To indicate configuration information of a neighbour cell.
measCycleSCell
Parameter: Tmeasure_scc
This parameter is used when a secondary cell (SCell) operates on a
frequency indicated by measObject and is in an inactive state.
measSubframeCellList
This is a list of cells to which measSubframePatternNeigh is applied.
If not included, a UE assumes that a time domain measurement
resource restitution pattern is applied to all neighbour cells.
measSubframePatternNeigh
This is a time domain measurement resource restriction pattern
used when an RSRP and an RSRQ are measured for a
neighbour cell on a carrier frequency indicated by the carrierFreq.

As described above, the MeasObjectEUTRA IE includes configuration information of a neighbour cell (i.e., NeighCellConfig) and a time domain measurement resource restriction pattern (i.e., measSubframePatternNeigh) used to measure an RSRP and an RSRQ for the neighbour cell and a cell list (i.e., measSubframeCellList) to which the pattern is applied.

Meanwhile, the UE 100 also receives a radio resource configuration IE as illustrated.

The radio resource configuration dedicated IE is used to configure/modify/release a radio bearer or is used to modify a MAC configuration. The radio resource configuration dedicated IE includes subframe pattern information. The subframe pattern information is information regarding a measurement resource restriction pattern on a time domain for measuring an RSRP and an RSRQ as to a primary cell (PCell).

The radio resource configuration IE includes fields shown in the following table.

TABLE 4

| RadioResourceConfigDedicated |
| --- |
| measSubframePatternPCell-r10 |

The RadioResourceConfigDedicated field includes the following parameters.

TABLE 5

Descritioon on radioResourceConfigDedicated field
logicalChannelConfig
It is used to select whether a logical channel configuration is explicitly signaled for SRBs or a default logical channel configuration is configured for an SRB1.
logicalChannelIdentity
A logical channel identifier for identifying both of an uplink (UL) and a downlink (DL).
mac-MainConfig
This is an option used to indicate whether mac-MainConfig is explicitly signaled or a default MAC main configuration is configured.
measSubframePatternPCell
A time domain measurement resource restriction pattern for performing a measurement (RSRP, RSRQ) as to a primary cell (PCell, i.e., a first cell) (or a serving cell).

As described above, the RadioResourceConfigDedicated field includes measSubframePatternPCell or measSubframePattern-Serv which indicates a time domain measurement resource restriction pattern for performing a measurement (RSRP, RSRQ) as to the primary cell (PCell, i.e., a first cell) (or a serving cell).

<Introduction of Small Cell>

Meanwhile, in a next-generation mobile communication system, it is expected that a small cell of which a cell coverage radius is small is added in the coverage of the existing cell and that the small cell handles a greater amount of traffic. The existing cell has a greater coverage than that of the small cell, and thus is also referred to as a macro cell. Hereinafter, it is described with reference to FIG. 9.

Figure 9:
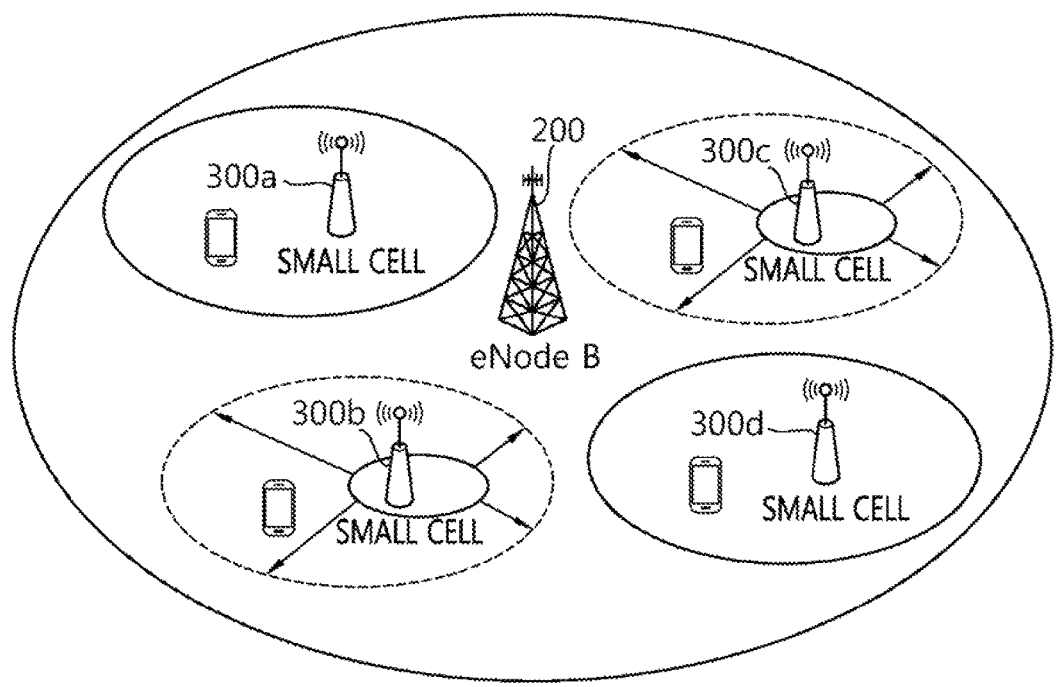
FIG. 9 shows a heterogeneous network environment in which a macro cell and a small cell co-exist and which is possibly used in a next-generation wireless communication system.

FIG. 9 shows a heterogeneous network environment in which a macro cell and a small cell co-exist and which is possibly used in a next-generation wireless communication system.

Referring to FIG. 9, it is shown a heterogeneous network environment in which a macro cell 200 overlaps with one or more small cells 300a, 300b, 300c, and 300d. A service of the macro cell 200 is provided by a macro eNodeB (MeNB). In the present specification, the macro cell and the MeNB may be used together. A UE having access to the macro cell 200 may be referred to as a macro UE. The macro UE 200 receives a downlink signal from the MeNB, and transmits an uplink signal to the MeNB.

In such a heterogeneous network, coverage holes of the macro cell can be filled by configuring the macro cell as a primary cell (Pcell) and by configuring the small cell as a secondary cell (Scell). In addition, overall performance can be boosted by configuring the small cell as the Pcell and by configuring the macro cell as the Scell.

However, due to the introduction of the small cell, an inter-cell interference may be further increased.

In the most fundamental method for solving such an interference problem, different frequencies are used between cells. However, since a frequency is a rare and expensive resource, a method of solving the problem by using a frequency division is not much welcomed by an operator.

Therefore, 3GPP intends to solve such an inter-cell interference problem through a time division.

Accordingly, recently, an enhanced inter-cell interference coordination (eICIC) is actively under research as one of interference coordination methods in 3GPP.

The time division method introduced in LTE release-10 is called an enhanced inter-cell interference coordination (ICIC) in a sense that it is more enhanced than the conventional frequency division method. In this method, an interfering cell is called an aggressor cell or a primary cell, an interfered cell is defined as a victim cell or a secondary cell, the aggressor cell or the primary cell stops a data transmission in a specific subframe, and a UE is allowed to maintain a connection with the victim cell or the secondary cell in the corresponding subframe. That is, in this method, if heterogeneous cells co-exist, one cell temporarily stops a signal transmission as to a UE which experiences a significantly high interference in a certain area, so that an interference signal is almost not sent.

Meanwhile, a specific subframe in which the data transmission stops is called an almost blank subframe (ABS). No data is transmitted other than essential control information in a subframe corresponding to the ABS. For example, the essential control information is a CRS. Accordingly, data is not transmitted in a subframe to which the ABS is applied, and only a CRS signal is transmitted in symbols 0, 4, 7, and 11.

Figure 10A:
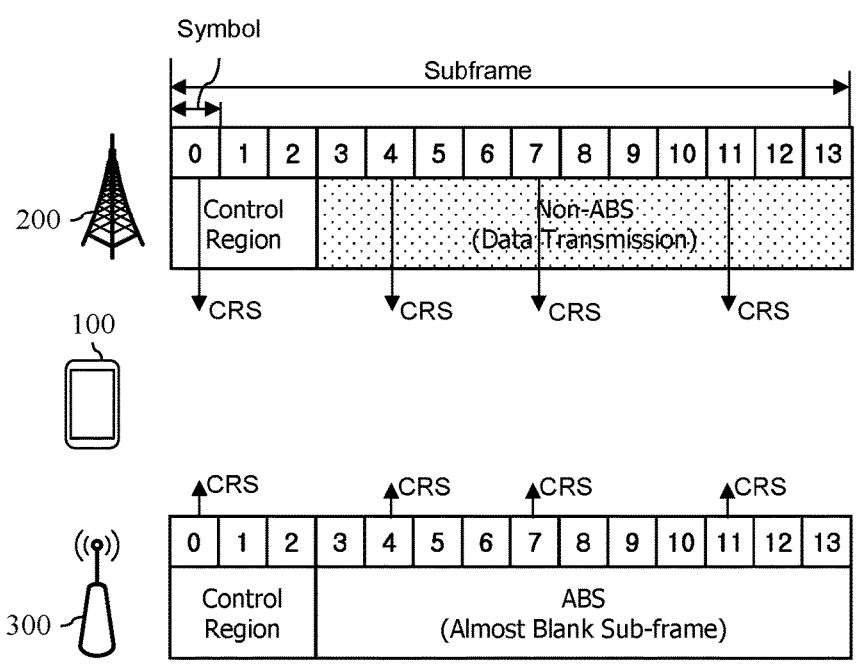
FIG. 10a shows an example of an enhanced inter-cell interference coordination (eICIC) for solving an interference between BSs.

FIG. 10a shows an example of an enhanced inter-cell interference coordination (eICIC) for solving an interference between BSs.

Referring to FIG. 10a, a first cell 200a performs a data transmission in a data region of a subframe as illustrated.

In this case, a second cell 200b applies the eICIC to solve an interference. That is, if the eICIC is applied, a corresponding subframe is operated according to an ABS, and thus no data may be transmitted in the data region.

However, in a subframe operated according to the ABS, only a CRS may be transmitted on symbols 0, 4, 7, and 11.

Figure 10B:
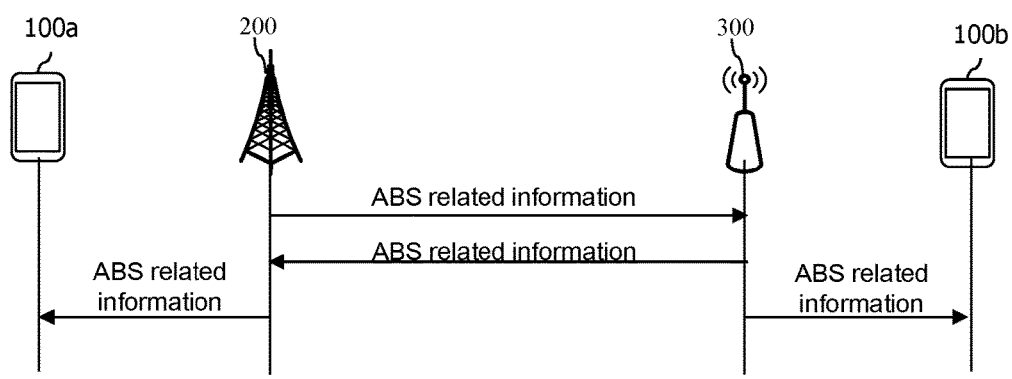
FIG. 10b shows an example of exchanging information related to an almost blank subframe (ABS) subframe.

FIG. 10b shows an example of exchanging information related to an ABS subframe.

As can be seen with reference to FIG. 10b, ABS related information may be exchanged between a first eNodeB 200a and a second eNodeB 200b through an X2 interface.

In addition, each of the first eNodeB 200a and the second eNodeB 200b may deliver the ABS related information to its serving UE 100a/100b.

Each of the first eNodeB 200a and the second eNodeB 200b may configure a measurement subset for its serving UEs 100a/100b on the basis of one or more of its ABS related information and counterpart's ABS relation information, and thereafter may deliver it.

The corresponding cell 200a/200b does not transmit a downlink signal on a downlink subframe which is set to the ABS, or transmits the downlink signal with decreased power. Therefore, a level of an interference having an effect within a coverage of another cell may be decreased in comparison with a downlink subframe which is not set to the ABS. Since the level of the interference may vary depending on whether the subframe is set to the ABS, the UE 100 must perform a measurement only on a predetermined specific subframe.

For this, on the basis of one or more of its ABS pattern information and counterpart's ABS pattern information, each of the cells 200a/200b may instruct its serving UE 100a/100b to perform a measurement only in a specific subframe. This is called a restricted measurement. The instruction may be delivered through a higher layer signal. The higher layer signal may be an RRC signal. The signal may be a CQI-ReportConfig element.

The ABS related information may include ABS information and an ABS status.

First, the ABS information may include one or more of information elements shown in the following table for example. The ABS pattern information is information which represents a subframe to be used as an ABS in a bitmap format. It may be configured with a bitmap of 40 bits in case of FDD and up to 70 bits in case of TDD. For example, in FDD, the 40 bits indicate 40 subframes, and if a bit value is 1, it indicates an ABS, and if the bit value is 0, it indicates a non-ABS subframe. A measurement subset is a subset of ABS pattern information, and is configured with a bitmap of 40 bits in the FDD case and up to 70 bits in the TDD case. Such a measurement subset is to configure a restricted measurement to a corresponding UE.

TABLE 6

| IE | Description |
| --- | --- |
| ABS Pattern Info | At each position of the bitmap, a value "1" indicates 'ABS', and a value "0" indicates 'non-ABS'. A first position of the ABS pattern corresponds to subframe 0 in a radio frame where SFN = 0. The ABS pattern is continuously repeated in all radio frames. The maximum number of subframes is 40. |
| Measurement Subset | It indicates a subset of the ABS Pattern Info, and is used to configure specific measurements for the UE. |
| ABS Inactive | It indicates that interference coordination by means of ABS is not active. |

Next, the ABS status is used to allow a corresponding cell to determine whether to change an ABS pattern. Usable ABS pattern information is a subset of ABS pattern information, and also consists of a bitmap. The Usable ABS pattern information indicates whether a subframe designated as an ABS is properly used for a purpose of an interference mitigation. The downlink ABS status is a ratio of the number of downlink resource blocks (RBs) scheduled in a subframe indicated in the usable ABS pattern information and RBs allocated for a UE which must be protected using the ABS, and indicates how effectively the ABS is utilized in a victim cell according to an original purpose.

TABLE 7

| IE | Description |
| --- | --- |
| DL ABS status | Percentage of used ABS resources. The numerator of the percentage consists of resource blocks within the ABS indicated in the Usable ABS Pattern Info, and the denominator of the percentage is the total number of resource blocks within the ABS indicated in the Usable ABS Pattern Info. |

TABLE 7-continued

| IE | Description |
| --- | --- |
| Usable ABS Pattern Info | Each position in the bitmap represents a subframe. A value "1" indicates 'ABS' designated as being protected from inter-cell interference, and a value "0" is used for all other subframes. The pattern represented by the bitmap is a subset of, or the same as, the corresponding ABS Pattern Info. |

A measurement subset consisting of a subset of the ABS pattern information is a subframe used as an ABS. Other subframes may autonomously determine whether a corresponding cell is utilized as an ABS according to a traffic load.

However, as described above, the RSSI and the RSRQ are calculated by considering a noise included in a received signal. In this case, in the ABS subframe, the RSSI and the RSRQ are calculated to be high since data is not included and thus a noise is relatively small. In a normal subframe (i.e., non-ABS subframe) not the ABS subframe, the RSSI and the RSRQ are calculated to be low since data is included and thus a noise is high. Therefore, through a restricted measurement, an eNodeB of a serving cell may deliver to a corresponding UE a measurement subframe pattern (i.e., measSubframePatternPcell) of the serving cell which instructs to perform a measurement only on a specific subframe and a measurement subframe pattern (i.e., measSubframePatternNeigh) of a neighboring cell. However, the measurement subframe pattern of the neighboring cell and the primary cell may not be correctly delivered to the UE according to a situation.

As such, if the measurement subframe pattern is not delivered to the UE, there is a problem in that the RSSI and the RSRQ vary according to on which subframe the UE 100 performs a measurement. Hereinafter, this will be described with reference to FIG. 11.

Figure 11:
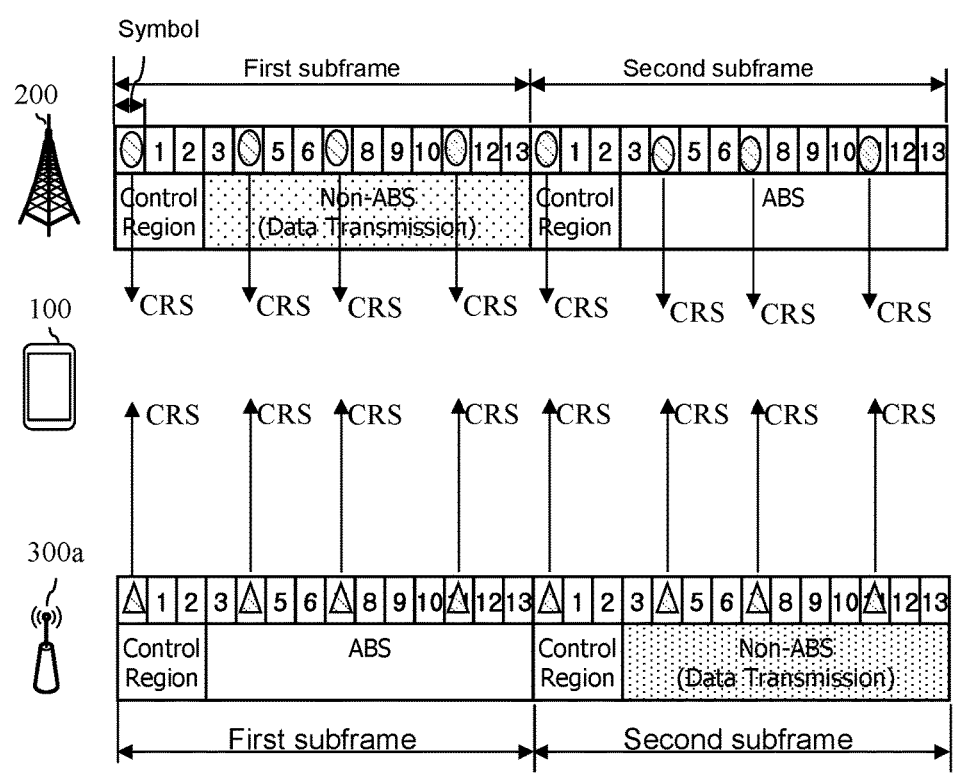
FIG. 11 shows an example in which a UE performs a radio resource measurement (RRM) when a macro cell and a small cell operate according to an eICIC.

FIG. 11 shows an example in which a UE performs an RRM when a macro cell and a small cell operate according to an eICIC.

Referring to FIG. 11, when a macro cell is a serving cell (e.g., a primary cell) of a UE 100 and a small cell 300 is a neighboring cell of the UE 100, the UE 100 performs an RRM measurement to move from the macro cell to the small cell.

In this situation, when the UE 100 fails to receive a measurement subframe pattern (i.e., measSubframePattern-Pcell) from an eNodeB 200 of the macro cell corresponding to the serving cell, the UE 100 does not know on which subframe the measurement will be performed. In particularly, when the eNodeB 200 of the macro cell applies the eICIC, a calculation result of RSSI and RSRQ is different according to whether a subframe on which the UE performs the measurement is an ABS subframe or a normal subframe (i.e., a non-ABS subframe), which results in a problem in that the UE 100 cannot move from the macro cell to the small cell. As a simple method for solving this problem, there may be a method of performing a measurement across several subframes and of averaging the measurement results. However, if a ratio of the ABS subframe and normal subframe included in the several subframes is not similar, the averaged measurement value may not be reliable. Therefore, one disclosure of the present specification will be described hereinafter to solve the aforementioned problem.

<One Disclosure of the Present Specification>

One disclosure of the present specification proposes a method by which a UE correctly performs an RRM measurement upon a failure in receiving a measurement subframe pattern (i.e., easSubframePatternPcell) of a primary cell.

Figure 12:
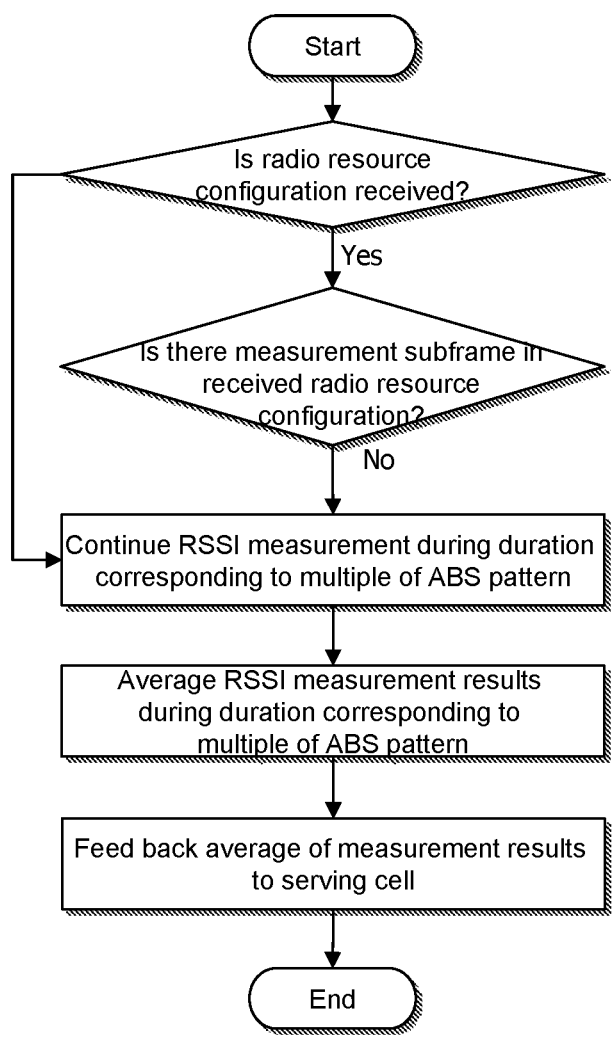
FIG. 12 is a flowchart showing a method according to one disclosure of the present specification.

FIG. 12 is a flowchart showing a method according to one disclosure of the present specification.

As shown in FIG. 12, when it fails to receive a radio resource configuration including a measurement subframe pattern for a serving cell or when the radio resource configuration is received but the measurement subframe pattern for the serving cell is not included in the received radio resource configuration, according to one disclosure of the present specification, the UE 100 continues an RSSI measurement during a duration corresponding to a multiple of an ABS pattern.

Since the ABS pattern is constructed in unit of 40 subframes, the multiple may be 40 subframes, 80 subframes, 120 subframes, 160 subframes, or the like. In this case, a maximum duration in which the RSSI measurement is continued may be limited to up to 200 subframes. This is because a report for the measurement is achieved in unit of 20 ms corresponding to 200 subframes.

Next, the UE 100 averages the measurement results during the duration corresponding to the multiple of the ABS pattern, and thereafter feeds back the average of the measurement results to the serving cell.

The aforementioned embodiments of the present invention can be implemented through various means. For example, the embodiments of the present invention can be implemented in hardware, firmware, software, combination of them, etc. Details thereof will be described with reference to the drawing.

Figure 13:
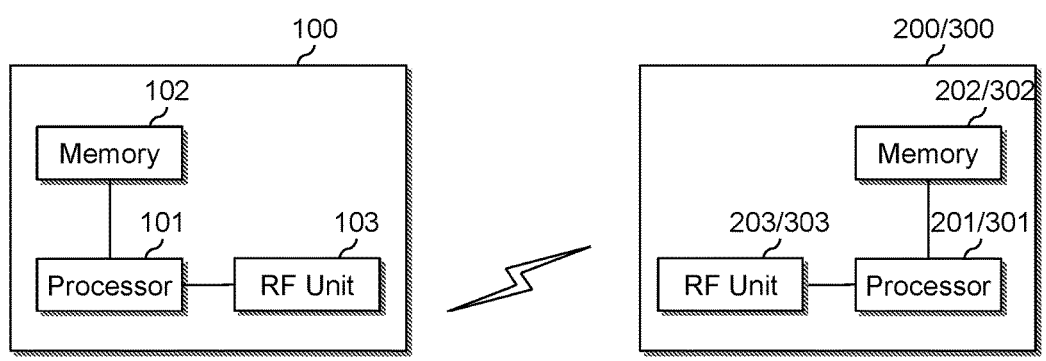
FIG. 13 shows a wireless communication system according to a disclosure of the present specification

FIG. 13 is a block diagram showing a wireless communication system according to an embodiment of the present invention.

ABS 200/300 includes a processor 201/301, a memory 202/302, and a radio frequency (RF) unit 203/303. The memory 202/302 coupled with the processor 201/301 store a variety of information for driving the processor 201/301. The RF unit 203/303 coupled to the processor 201/301 transmit and/or receive a radio signal. The processor 201/301 implement the proposed functions, procedures, and/or methods. In the aforementioned embodiment, an operation of the BS may be implemented by the processor 201/301.

A UE 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method of performing a measurement by a user equipment (UE), the method comprising:
   determining, by the UE, whether or not the UE has received a measurement subframe pattern indicating subframes to be used to perform a measurement for a serving cell to which an enhanced inter-cell interference coordination (eICIC) is applied;
   performing, by the UE, the measurement on a received signal strength indication (RSSI), wherein when the UE determines that the measurement subframe pattern has not been received, the measurement is maintained during a duration corresponding to a multiple of an almost blank subframe (ABS) pattern;
   determining, by the UE, an average value of measurement results on the RSSI during the duration corresponding to the multiple of the ABS pattern; and
   transmitting, by the UE, the average value of the measurement results on the RSSI to the serving cell.

2. The method of claim 1, further comprising:
   receiving a radio resource configuration; and
   determining whether the measurement subframe pattern is included in the radio resource configuration.

3. The method of claim 1, wherein the measurement on the RSSI is performed when a radio resource configuration comprising the measurement subframe pattern is not received.

4. The method of claim 1, wherein the multiple of the ABS pattern corresponds to 40, 80, 120, 160, or 200 subframes.

5. The method of claim 1, wherein the measurement determines reference signal received quality (RSRQ) or reference signal received power (RSRP).

6. A user equipment (UE) for performing a measurement, the UE comprising:
   a processor configured to:
      determine whether or not the UE has received a measurement subframe pattern indicating subframes to be used to perform a measurement for a serving cell to which an enhanced inter-cell interference coordination (eICIC) is applied,
      perform a measurement on a received signal strength indication (RSSI), wherein when the processor determines that the measurement subframe pattern has not been received, the measurement is maintained during a duration corresponding to a multiple of an almost blank subframe (ABS) pattern, and
      determine an average value of measurement results on the RSSI during the duration corresponding to the multiple of the ABS pattern; and
   a transceiver configured to transmit the average value of the measurement results on the RSSI to the serving cell.

7. The UE of claim 6, wherein the processor further receives a radio resource configuration, and determines whether the measurement subframe pattern is included in the radio resource configuration.

8. The UE of claim 6, wherein the processor performs the measurement on the RSSI when a radio resource configuration including the measurement subframe pattern is not received.

9. The UE of claim 6, wherein the multiple of the ABS pattern corresponds to 40, 80, 120, 160, or 200 subframes.

10. The UE of claim 6, wherein the measurement determines reference signal received quality (RSRQ) or reference signal received power (RSRP).

\* \* \* \* \*